3,472,662
FRUIT PRESERVATION PROCESS
Don F. Mason, Winter Park, Fla., assignor to A. Duda & Sons, Inc., Oviedo, Fla., a corporation of Florida
No Drawing. Filed Mar. 2, 1966, Ser. No. 531,076
Int. Cl. A23b 7/00
U.S. Cl. 99—168                             9 Claims

ABSTRACT OF THE DISCLOSURE

A process for treating fruits such as apples, berries, peaches, celery, lettuce, carrots, etc., by contacting the fruit with a mixture of a dry carboxyalykl cellulose derivative in an amount between 0.05 to 1.0 percent by weight of the total product and an additional gum in an amount up ot 75 percent by weight of the carboxyalkyl cellulose derivative to improve the dispersibility of the carboxyalkyl cellulose derivative on the fruit, thus coating the mixture on the fruit and absorbing the carboxyalkyl cellulose derivative within the fruit so that the fruit is preserved from deterioration and loss of juices and shape during subsequent heat treatment of the fruit.

---

This invention relates generally to a process for treating fruits. More particularly, the present invention relates to treatment of fruits and resulting products, which enables the fruit to be preserved for long periods of time in the atmosphere, and which also permits canning or otherwise heat treating of fruits by retaining the texture, shape, and juices of the fruit.

For the purposes of this application and claims, the term "fruit" is used in its generic sense to include both the commonly referred to fruits, such as apples, berries, peaches, plums, and the like, as well as vegetables, such as celery, lettuce, carrots, peas, beans, potatoes, and the like.

The preservation of fruits has been exhaustively studied, and in the past almost an infinite number of different processes have been proposed, all of which seek to preserve the fruit from deterioration, which naturally occurs in the atmosphere, primarily due to the presence of oxygen. Canning certainly is one of the very common and perhaps most widely utilized processes for preserving such fruits. However, while having many attributes, including good storage characteristics, canning, nevertheless, by reason of the conventional heat processing to pasteurize the fruit, does cause softening of the fruit and loss of the juices, and frequently a breakdown of the cell structure, resulting in a complete loss of the texture commonly associated with the product in the fresh state. Vegetables, such as celery and cabbage, for example, are particularly susceptible to heat processing, and the art has not successfully developed any process for canning or heat treating such fruits, wherein they may retain the same crispness, texture, appearance, and taste after canning as possessed in the fresh state. The same is also true of berries, such as strawberries, or other fruits, such as apples, wherein the canning process results in a complete softening, or mushiness, of the product, producing a far less desirable texture as compared with the fresh fruit. If fruits are not canned, or conventionally processed for preservation, it is well known that they tend to deteriorate rapidly in the atmosphere and in short periods of time degrade into soft mashes with an even greater loss of texture, appearance, and taste.

The art has developed many processes in an effort to eliminate the disadvantages and undesirable results attributable to prior practices; however, none have been found to be commercially successful.

One such process is disclosed in U.S. Patent No. 2,728,676, to Leland H. Burt, issued Dec. 27, 1955. In this patent apples are processed in an attempt to prevent loss in texture or firmness with the use of an aqueous sucrose solution containing sodium carboxymethyl cellulose. The solution is heated and applied hot to the fruit; however, it has been found that when the carboxymethyl cellulose is put into solution and the solution made to contact the fruit in a conventional manner, the pores of the fruit may weep, resulting in loss of juice, and therefore result in a substantial loss in flavor. Moreover, the loss in juices aids in the breakdown of the cell structure, with a subsequent loss in firmness and texture.

It has been found that when carboxymethyl cellulose is used to treat fruits in a conventional manner, such as disclosed in the Burt patent, the carboxymethyl cellulose is in solution, and accordingly is already hydrated to produce the characteristic swelling that necessarily follows from hydration. The carboxymethyl cellulose, being in effect prehydrated and preswelled, is capable of no further hydration, and accordingly there is no further increase in swelling to properly block the pore passages. The pores of the fruit, when treated with a conventional solution of carboxymethyl cellulose will nevertheless weep, producing the attendant loss in flavor and texture, and will not adequately inhibit the atmospheric oxygen from entering the pores, thus leading to degradation of the fruit.

It is, therefore, a principal object of the present invention to provide a method and resulting product which preserves the fruit and retains a firm texture as compared with untreated or conventionally treated fruits.

It is a more particular object of the present invention to provide a method and resulting product which retains the natural flavor of fruits, along with the natural shape and texture, even upon the application of heat, such as in the conventional canning process.

This invention also has as an object the provision of a method and production in which the pores of the fruit are clogged or plugged to prevent the loss of natural juices, while inhibiting oxidation, and thereby substantially aiding the retention of the natural firmness of the fruit.

It is generally an object of the present invention to provide a method and a production of preservation of fruit such that the fruit will not deteriorate in the short period of time when exposed to the atmosphere or lose flavor and texture upon the application of heat.

Briefly, the present invention treats any fruit with a dry carboxymethyl cellulose derivative alone, or mixtures with other gums, as well as the optional addition of fruit acids, whereby the carboxymethyl cellulose derivative is hydrated within the pores of the fruit so as to swell within and thereby clog or plug the pores, preventing the loss of juice and flavor and inhibiting oxidation, in order to retain the firmness and texture found in the fresh untreated fruit. Starch may also be added to assist in preventing bleeding, as well as to soak up any excess water. Moreover, the present invention permits the fruit to undergo the conventional heating step for pasteurization, or any other similar heating, while retaining the original shape and texture and having no undesirable loss in firmness.

Fruits with which this invention is concerned include a wide variety of fruits in the generic sense. These fruits herein mentioned are only by way of example and the invention is not to be limited to these fruits.

In accordance with the usual steps of processing fruits, the fruit in accordance with the present invention must be washed and cleaned of all dirt, straw, debris, and the like. If the fruit is desired to be pitted or cored, de-skinned, or de-stemmed, in the conventional manner in accordance with the usual practice with such fruits, the fruit should be so treated if the fruit is to be ultimately canned. It should be understood, however, that in accordance with the present invention, the fruit can be cold processed and need not be subjected to canning. Such cold processed fruit will be preserved for longer periods of time than the fresh untreated fruit. However, the fullest benefit from this invention will be attained if the fruit is canned or otherwise heat processed, such as baked, fried, or other heating steps to which food may normally be subjected.

After the fruit has been treated to remove all of the undesired constituents, the process of the present invention comes into play. The fruit is treated with dry carboxyalkyl cellulose derivative. The water soluble carboxyalkyl cellulose derivatives that may be used in accordance with the present invention include the sodium, potassium, and other alkali metals, as well as magnesium and ammonium salts of carboxymethyl cellulose, carboxyethyl cellulose, carboxypropyl cellulose, the hydroxyalkyl carboxyalkyl cellulose, such as hydroxyethyl methylcarboxy cellulose, the alkyl carboxyalkyl cellulose, the methylcarboxymethyl cellulose, and hydroxyethyl carboxyethyl cellulose. The sodium salt of carboxymethyl cellulose has been found to be particularly useful and is the preferred derivative.

The fruit is then treated with the dry carboxyalkyl cellulose derivative in a manner sufficient to coat or impregnate each particle of fruit with the dry powdered carboxyalkyl cellulose derivative. It may be stated that the fruit can be diced, chopped, or otherwise cut to expose more pore surfaces to readily admit the dry carboxyalkyl cellulose derivative into the pore; however, it has been found that it is not essential to create open pore surfaces, since the caroxyalkyl cellulose derivative is absorbed into any of the surface pores of the fruit.

It is not precisely certain exactly what occurs in the fruit upon the absorption of the carboxyalkyl cellulose derivative; however, it is believed that the hydration of the carboxyalkyl cellulose derivative occurs within the pores of the fruit, thereby swelling the carboxyalkyl cellulose derivative, due to the hydration, so as to attach and secure to the walls of the pores and to block completely the openings of the pores. There is then created in effect an impregnable wall to lock in the juices. The swelling of the carboxyalkyl cellulose derivative within the pores tends also to structurally support the cell walls and therefore retain the original shape and size of the fruit while preventing any loss of firmness. The blocking of the pores also prevents—or at least substantially retards—the entance of oxygen to the pores and to the fruit to cause oxidation and rapid deterioration formerly experienced.

The method of coating the carboxyalkyl cellulose derivative on the fruit is not critical and any tumbling or mixing procedure which does not damage the fruit, but which permits substantially uniform coating of the carboxyalkyl cellulose derivative is satisfactory. Time is not a factor in the achievement of the benefits of the application of the carboxylalkyl cellulose derivative to the fruit, since it has been found that hydration occurs substantially immediately upon its application. Generally a few minutes is all that is necessary for the blockage of the pores to be substantially complete, although longer periods of time, even up to a few hours, also produce satisfactory results.

The amount of carboxyalkyl cellulose derivative that is to be used varies and may range, for example, between .05% to 1%, based on the weight of the dry carboxyalkyl cellulose derivative to the total weight of the product. It has been found that approximately .25% to .5% is the preferable range.

In order to enhance the application of the carboxyalkyl cellulose derivative to the fruit and particularly to aid the dispersing of the carboxyalkyl cellulose derivative on the fruit, it has been found that optionally other gums may be added to the carboxyalkyl cellulose derivative in an amount up to 75% of the weight of the carboxyalkyl cellulose derivative added, and preferably 25% to 50%. These optional gums may include locust bean, guar, carragheim, tragacanth, kelko algins, acacia, burtonite, and agar. These gums have a beneficial effect when utilized with carboxyalkyl cellulose derivative and actually are synergistic, since the resulting product is improved over the use of carboxyalkyl cellulose derivative alone; however, it is to be understood that the carboxyalkyl cellulose derivative alone will provide satisfactory results, and it has been found that carboxyalkyl cellulose derivative is a necessary ingredient.

It has also been found that fruit acids, such as citric, fumaric, tartaric, and malic, may optionally be added to the carboxyalkyl cellulose derivative alone or in conjunction with the other optional gums. The fruit acids have been found to produce better stability, and even add to the preservation of the fruit. Furthermore, they permit less browning or other discoloration of the product and retard molding. Such fruit acids may be added in an amount up to 25%, based upon the weight of the carboxyalkyl cellulose derivative added, and preferably approximately 5% to 15%.

It has been found that the addition of starch to the fruit provides a means for improving the appearance of the fruit and also acts to absorb water and juices that may be present on the fruit so as to prevent wetting or drain in salads and other food preparations.

When the friut is to be heat processed, it is desirable to soak up water that arises from a preliminary cooking in an open kettle prior to canning. While the addition of starch is not an absolute necessity, it is highly desirable, since it does further aid the carboxyalkyl cellulose derivative in inhibiting bleeding. For the heat processing fruit, the starch that must be used is that which is highly refined. For the purposes of this patent application a starch which produces a clear solution in water is sufficiently highly refined. The types of starches found to be suitable are the highly refined tapioca and corn starch which produce aqueous solution at over 100° F.

The starch should be in the form of a hot solution when added to the fruit to be heat processed, the temperature of the hot starch solution being generally somewhere between atmospheric temperature and 165° F. Although these temperatures are not critical, they are the recommended temperatures. The starch solution may have a concentration anywhere between 1% to 10% starch in water, with 2% to 3% concentration starch preferred. The amount of the starch solution to be added to the fruit may range from between 1% to 5%, and preferably 2% to 2.5% of the total cooking kettle contents which includes the fruit and the carboxyalkyl cellulose derivative.

The fruit to be processed after it has been treated with the carboxyalkyl cellulose derivative is heated in a kettle with a minimum amount of water to process the fruit and heated to between 175° and 212° F., and preferably 190° to 212° F., to pasteurize the fruit in the known manner in the canning industry. It is at this point that the hot starch slurry is to be poured into the near boiling mass and cooked for a few minutes, the time not being critical, although 1 to 3 minutes has been found to be sufficient when the temperature is approximately 190° to 212° F. After the cooking the contents of the kettle may be dropped into cans by conventional automatic filling and closing apparatus. The drop into the cans generally reduces the temperature 10° to 15°; however, the temperature in the can should be between 180° and 205° F., with approximately 190° F. the preferable temperature. The cans after closing are inverted for several minutes, generally approximately 3 minutes, to properly sterilize the interior of the can and the lid of the can, after which time the cans are dropped automatically into cold water for cooling to a temperature of approximately 135° F.

With respect to the invention being applied to cold processed fruit, the starch is found again to have an enhanced effect which adds to the substantial benefit obtained by carboxyalkyl cellulose derivatives alone. The starch, when added to the fruit to be cold processed, should be cold swelling, highly refined starch, which produces a clear solution, but in water, at under 100° F. Again the starches obtained from tapioca and corn are suitable.

The starch for cold processing fruit should be added in the dry form with dry carboxyalkyl cellulose derivative, and both the starch and the carboxyalkyl cellulose derivative added as a mixture to the fruit. The amount of starch found to be desirable to be used with the carboxyalkyl cellulose derivative is from .5% to 10%, with .5% to 1% preferable dry starch per weight of the fruit.

The starch-carboxyalkyl cellulose derivative mixture has been found to have an enhanced effect when used with celery, cabbage, and the like and permits cold storage for periods of time far longer than is permitted with untreated fruit.

The following examples illustrate the present invention:

EXAMPLE I 100 pounds of fresh celery is washed and cleaned in the usual manner and cut into half inch pieces and placed in a conventional mixing bowl. .25 pound of dry carboxymethyl cellulose was sprinkled gradually over the celery while the celery was agitated in an open kettle to coat the celery. Heat was applied to cook the celery at approximately 205° F. After 3 minutes of cooking, the coated celery was removed and dropped into cans at about 190° F. and closed. The cans were then inverted and then cooled in the conventional manner. The cans were subsequently opened, and it was found that the celery retained its texture and firmness and was crisp to taste to a degree expected only of fresh celery.

EXAMPLE II

Strawberries were substituted for the celery and the berries were processed whole. After canning in the conventional manner the strawberries were found to be firm in texture, delicious in taste, and maintained approximately the same size and shape without any noticeable mushiness.

EXAMPLE III

Carrots were used in accordance with the process of Example I, along with 0.8 pound of locust bean gum, which was premixed with the carboxymethyl cellulose and sprinkled on the carrots which had been previously sliced into ⅛ inch slices. It was found that the dispersibility of the carboxymethyl cellulose was improved and facilitated without any balling of the gums. The carrots were canned in the conventional manner, and on opening, the cans were found to retain a desirable texture and firmness far better than conventionally canned carrots.

EXAMPLE IV

The process of Example I was followed with ½ inch wedges of apples. 100 pounds of apples were mixed with .25 pound of carboxymethyl cellulose, .1 pound of tragacanth gum, and .025 pound of citric acid. The apples were mixed and canned in the usual manner, and it was found that the apples exhibited fine flavor without any evidence of browning and had a solid texture without any noticeable mushiness.

EXAMPLE V

¼ pound of the celery of Example I was mixed with 3 pounds of chopped meat, baked in an oven at 375° F. for one-half hour and at 325° F. for three-quarters hour, and it was found that the celery remained crisp without any alternation in the steps of the method of the present invention.

EXAMPLE VI

The method of Example I was followed up to the cooking of the celery in the open kettle. At this point highly refined tapioca starch, previously formed into a 3% aqueous solution at 150° F. was added in the amount of 2% to the carboxymethyl cellulose-celery mixture and cooked gently for 3 minutes at approximately 200° F. The same canning procedure as in Example I was then followed. After storage and subsequent opening of the can, it was found that the celery was crisp and of good color and appearance.

EXAMPLE VII 100 pounds of the celery as in Example I was mixed thoroughly with a mixture of .25 pound of dry carboxymethyl cellulose and 1 pound of highly refined dry starch. The celery pores were clogged to prevent undesirable weeping and bleeding. The celery was maintained in cold storage for many days until it was found that the untreated celery wilted badly and became mushy, while the treated celery retained its crispness and taste.

Carboxyalkyl cellulose derivative other than the sodium salt of carboxymethyl cellulose used in the foregoing examples can be used.

Flavorings, spices, inhibitors, such as sorbic acid or benzoate of soda, sugars, saccharin, the cyclamates, and monosodium glutamate, etc., may also be added, if desired, in the usual amounts.

From the foregoing detailed description it will be evident that there are a number of changes, adaptations, and modifications of the present invention which come within the province of those skilled in the art; however, it is intended that all such variations not departing from the spirit of the invention be considered as within the scope thereof as limited solely by the appended claims.

1. The process for treating fruits comprising: contacting the fruit with a mixture of a dry carboxyalkyl cellulose derivative in the amount between 0.05 percent to 1.0 percent by weight of total product and additional gum in an effective amount up to 75 percent by weight of carboxyalkyl cellulose derivative to improve the dispersibility of the carboxyalkyl cellulose derivative on the fruit, mixing said fruit and said mixture thereby absorbing said carboxyalkyl cellulose derivative within the fruit to preserve the fruit from deterioration, loss of juices, and shape during heat treatment of the fruit.

2. The process of claim 1, wherein the fruit is canned.

3. The process of claim 1, wherein the additional gum is selected from the group consisting of locust beam, guar, carragheim, tragacanth, kelco algins, acacia, butonite and agar.

4. The process of claim 1, wherein a fruit acid is admixed with the carboxyalkyl cellulose derivative and the fruit and is selected from the group consisting of fumaric, tartaric, malic, and citric.

5. The process of claim 4, wherein the amount of the fruit acid added is up to 25% of the weight of carboxyalkyl cellulose derivative.

6. The process of claim 4, including hydrating and swelling the carboxyalkyl cellulose derivative within the pores of said fruit to substantially block said pores, said fruit acid being present in the amount of 5–25% by weight of the carboxyalkyl cellulose.

7. The process of claim 4, wherein starch in an amount between .5% to 10% is added to the fruit prior to heat treatment.

8. The process of claim 7, wherein said starch is in an aqueous solution.

9. The process of claim 7, wherein the starch is mixed dry with the carboxyalkyl cellulose derivative and this admixture is mixed with the fruit.

References Cited

UNITED STATES PATENTS

| | | | |
|---|---|---|---|
| 2,665,992 | 1/1954 | Naps | 99—166 XR |
| 2,909,435 | 10/1959 | Watters et al. | 99—168 |
| 2,983,619 | 5/1961 | Shaw et al. | 99—186 |

FOREIGN PATENTS 681,052  10/1952  Great Britain.

A. LOUIS MONACELL, Primary Examiner

J. R. HOFFMAN, Assistant Examiner

U.S. Cl. X.R.

99—154, 186